United States Patent
Searl et al.

(10) Patent No.: US 10,313,722 B1
(45) Date of Patent: Jun. 4, 2019

(54) SYNCHRONIZING AUDIO CONTENT AND VIDEO CONTENT

(71) Applicant: Amazon Technologies, Inc., Seattle, WA (US)

(72) Inventors: Ron Searl, Seattle, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/717,373

(22) Filed: Sep. 27, 2017

(51) Int. Cl.
| | |
|---|---|
| H04N 21/24 | (2011.01) |
| H04N 21/242 | (2011.01) |
| H04N 21/233 | (2011.01) |
| H04N 21/234 | (2011.01) |
| H04N 21/2343 | (2011.01) |
| H04N 21/858 | (2011.01) |
| H04N 21/81 | (2011.01) |

(52) U.S. Cl.
CPC ..... *H04N 21/242* (2013.01); *H04N 21/23418* (2013.01); *H04N 21/23424* (2013.01); *H04N 21/812* (2013.01); *H04N 21/8586* (2013.01)

(58) Field of Classification Search
None
See application file for complete search history.

(56) References Cited

U.S. PATENT DOCUMENTS

| | | | | |
|---|---|---|---|---|
| 2012/0120314 A1* | 5/2012 | Yang | .................... | H04N 17/004 348/515 |
| 2015/0332732 A1* | 11/2015 | Gilson | ................. | G11B 27/036 386/240 |
| 2018/0158488 A1* | 6/2018 | Mangru | ................. | G11B 27/32 |

* cited by examiner

*Primary Examiner* — Ricky Chin
(74) *Attorney, Agent, or Firm* — Weaver Austin Villeneuve & Sampson LLP

(57) ABSTRACT

Techniques are described for synchronizing audio content and video content when server-side fragment insertion techniques are used.

20 Claims, 4 Drawing Sheets

Bitrate: 128 kbps

Fragment A: Time range =0 minutes 1 seconds to 0 minutes 5 seconds, Location = \Media\Movies\A093b2b_1.isma
Fragment B: Time range = 0 minutes 6 seconds to 0 minutes 10 seconds, Location = \Media\Movies\A093b2b_2.isma
Fragment X: Time range =0 minutes 11 seconds to 0 minutes 15 seconds, Location = \Media\Ads\B22x_1.isma, audioversion = nondrop
Fragment Y: Time range = 0 minutes 16 seconds to 0 minutes 20 seconds, Location = \Media\Ads\B22x_2.isma, audioversion = nondrop
Fragment Z: Time range = 0 minutes 21 seconds to 0 minutes 25 seconds, Location = \Media\Ads\B22x_3.isma, audioversion = drop
Fragment C: Time range =0 minutes 26 seconds to 0 minutes 30 seconds, Location = \Media\Movies\A093b2b_3.isma
Fragment D Time range = 0 minutes 31 seconds to 0 minutes 35 seconds, Location = \Media\Movies\A093b2b_4.isma

Bitrate: 64 kbps

Fragment A: Time range =0 minutes 1 seconds to 0 minutes 5 seconds, Location = \Media\Movies\A093b2b10_1.isma
Fragment B: Time range = 0 minutes 6 seconds to 0 minutes 10 seconds, Location = \Media\Movies\A093b2b10_2.isma
Fragment X: Time range =0 minutes 11 seconds to 0 minutes 15 seconds, Location = \Media\Ads\B22x10_1.isma, audioversion = nondrop
Fragment Y: Time range = 0 minutes 16 seconds to 0 minutes 20 seconds, Location = \Media\Ads\B22x10_2.isma, audioversion = nondrop
Fragment Z: Time range = 0 minutes 21 seconds to 0 minutes 25 seconds, Location = \Media\Ads\B22x10_3.isma, audioversion = drop
Fragment C: Time range =0 minutes 26 seconds to 0 minutes 30 seconds, Location = \Media\Movies\A093b2b10_3.isma
Fragment D Time range = 0 minutes 31 seconds to 0 minutes 35 seconds, Location = \Media\Movies\A093b2b10_4.isma

Bitrate: 32 kbps

Fragment A: Time range =0 minutes 1 seconds to 0 minutes 5 seconds, Location = \Media\Movies\A093b2b7_1.isma
Fragment B: Time range = 0 minutes 6 seconds to 0 minutes 10 seconds, Location = \Media\Movies\A093b2b7_2.isma
Fragment X: Time range =0 minutes 11 seconds to 0 minutes 15 seconds, Location = \Media\Ads\B22x7_1.isma, audioversion = nondrop
Fragment Y: Time range = 0 minutes 16 seconds to 0 minutes 20 seconds, Location = \Media\Ads\B22x7_2.isma, audioversion = nondrop
Fragment Z: Time range = 0 minutes 21 seconds to 0 minutes 25 seconds, Location = \Media\Ads\B22x7_3.isma, audioversion = drop
Fragment C: Time range =0 minutes 26 seconds to 0 minutes 30 seconds, Location = \Media\Movies\A093b2b7_3.isma
Fragment D Time range = 0 minutes 31 seconds to 0 minutes 35 seconds, Location = \Media\Movies\A093b2b7_4.isma

*FIG. 4*

SYNCHRONIZING AUDIO CONTENT AND VIDEO CONTENT

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Many older streaming devices include media players that cannot play back a bitstream that includes media content from more than one source (e.g., feature content and advertisement content). In addition, many streaming devices use media players that, with a software update, might be capable of playback of a bitstream that includes media content from more than one source. Unfortunately, the entity in control of delivering the media content is often different from the entity in control of the streaming devices and/or the update of their media players. Consequently, many streaming devices are currently unable to support playback of a bitstream that includes media content from more than one source.

BRIEF DESCRIPTION OF THE DRAWINGS

FIG. 4 is an example illustrating manifest data for delivery to a client device.

DETAILED DESCRIPTION

This disclosure describes techniques for synchronizing audio fragments and video fragments when advertisement content is included with primary content using server-side fragment insertion techniques. In order to insert different types of content into a manifest, video fragments can be generated with exact durations (e.g., 2 seconds). Unfortunately, audio sampling techniques do not always allow for audio fragments to be generated at durations that match the exact duration of the video fragments. Because the durations of video fragments and audio fragments are different, an increasingly apparent delay occurs between audio and video during playback which interferes with the playback experience of a user. The techniques described herein allow for removal of audio content frames to resynchronize audio and video content before the delay interferes with the playback experience. An example may be instructive.

Figure 1:
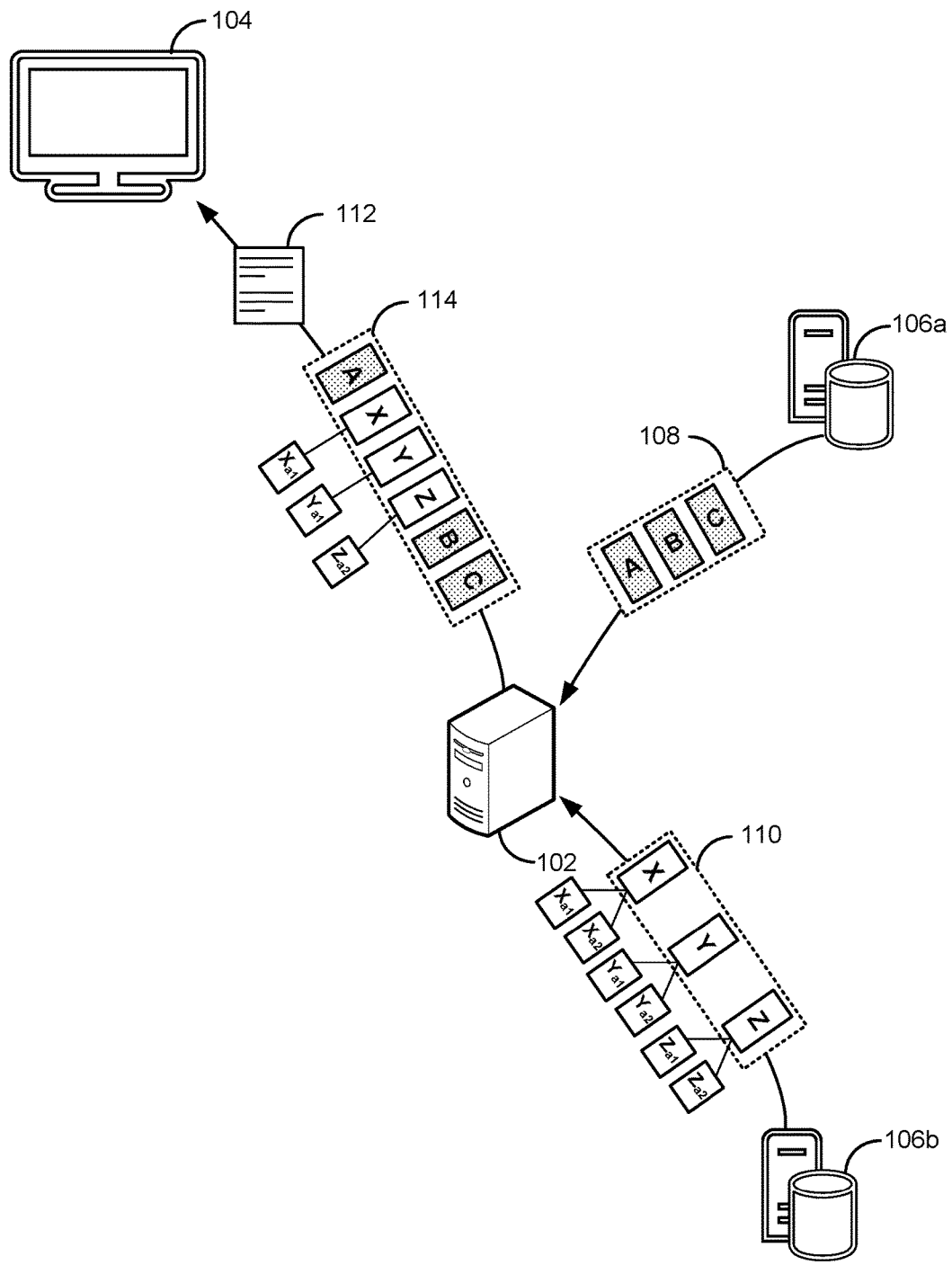
FIG. 1 illustrates an example of a system for synchronizing audio content and video content.

FIG. 1 illustrates an example of providing primary content with secondary content inserted using server-side fragment insertion techniques. In FIG. 1, client device 104 (e.g., a smart television (TV)) sends a request for playback of primary media content (e.g., an episode of Divorce) to media server 102.

To include secondary media content (e.g., an advertisement) with the primary media content, server-side fragment insertion techniques are used to generate manifest data for use by client device 104 in generating properly formatted requests for fragments of the content. After media server 102 receives the playback request, it identifies the Divorce media content stored at origin server 106a. Media server 102 identifies and selects Divorce fragments 108 to be associated with a manifest identifier (e.g. a uniform resource locator (URL)). In addition, media server 102 identifies advertisement fragments 110. In contrast to Divorce fragments 108, advertisement fragments 110 include two versions of the audio fragments that refer to substantially similar segments of audio content. That is, one version of the audio fragments are unaltered audio fragments (e.g., a complete sampling pattern), and the other version of the audio fragments are audio fragments with a frame removed from the end. For example, the secondary content fragment Z includes a first version of the audio fragment that is 2.005 seconds long and a second version of the audio fragment that is 1.995 seconds long. For the sake of brevity and clarity, this disclosure will primarily use the term "non-drop version" to refer to unaltered audio fragment and "drop version" to refer to audio fragments with a frame removed.

As media server 102 selects advertisement fragments to associate with the manifest identifier, media server 102 determines which version of the audio fragment should be used. Media server 102 identifies durations for video and audio fragments 110 (e.g., 6 seconds for the video fragments and 6.015 seconds for the audio fragments) if only non-drop audio fragments were used. Media server 102 then determines the potential delay between the audio and video during playback (e.g., 15 milliseconds). Finally, media server 102 determines whether the duration exceeds a threshold that represents when a user might perceive a lack of synchronization between audio and video during playback (e.g. 12.5 milliseconds). In this example, the duration exceeds the threshold, and as such, media server 102 selects non-drop versions of the audio fragments for fragments X and Y and selects the drop version of the audio fragment for fragment Z. Fragment selection continues in a similar manner for the remaining primary and secondary content to be added to the manifest identifier. After finishing the fragment selection process, media server 102 generates manifest identifier based on the selected fragments and provides it to client device 104. Client device 104 uses the manifest identifier to request manifest data 112.

Manifest data 112 includes references to fragments for both the primary content, i.e., Divorce, and the secondary content, i.e., advertisements, with some advertisement fragments being non-drop audio fragments (e.g., fragments X and Y) and other advertisement fragments being drop version audio fragments with a frame or sample removed. After receiving manifest data 112, client device 104 uses manifest data 112 to request fragments 114 from media server 102. The delay between audio and video for fragments X and Y increases during playback on client device 104; however, because fragment Z includes a drop version of the audio fragment, when client device 104 requests the next fragment for Divorce (e.g., fragment B), there will be no noticeable delay between the audio and video by the user.

Figure 2:
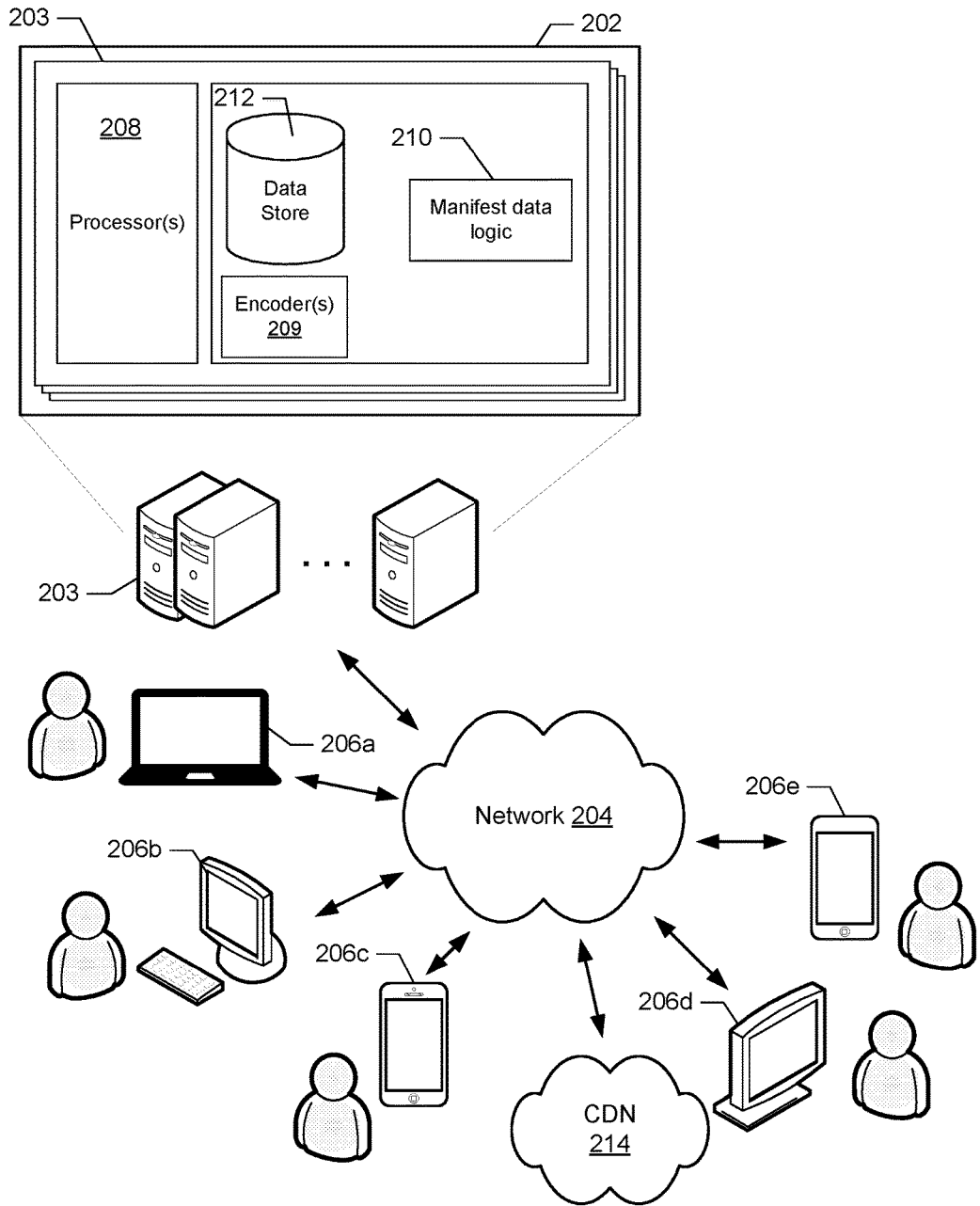
FIG. 2 is a simplified diagram of a computing environment in which various implementations may be practiced.

FIG. 2 illustrates an example of a computing environment in which a video content service 202 provides live streaming content and video-on-demand (VOD) content (e.g., audio or video) via network 204 to a variety of client devices (206a-e) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, HTTP networks, TCP/IP-based networks, telecommunications networks, wireless networks, satellite networks, cable networks, public networks, private networks, wide area networks, local area networks, the Internet, the World Wide Web, intranets, extranets, etc.

Client devices 206a-e may be any suitable device capable of connecting to network 204 for streaming on-demand and live streaming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

Server 203 includes one or more processors 208, one or more encoders 209, one or more data stores 212, and other hardware and/or software components to encode media content and provide the encoded media content to client devices 206a-e. Server 203 may be implemented by a variety of physical servers and/or virtual servers. In some implementations, server 203 is partitioned to have several virtual servers configured to perform different functions. In one example, one virtual server identifies primary manifest data and secondary manifest data for generating manifest identifiers using fragment insertion techniques, while a second virtual server generates fragments for delivery to client devices 206a-e. Server 203 includes logic configured to identify and select primary content and secondary content and base the generation of corresponding manifest data on the selected content (e.g., as represented by manifest generation logic 210).

Encoder 209 encodes media content that it receives from content providers such as, for example, content service 202, a third party content provider, an advertisement exchange server, etc. Alternatively, an advertisement server encodes the secondary content and provides it to content service 202 of FIG. 2 for storage. Encoding parameters and/or profiles are used to encode and package fragments of media content at various bitrates. The primary content and secondary content may be encoded using similar encoding profiles, which allow for a seamless playback experience during transitions between the two types of content. Moreover, two versions of the secondary content can be generated (e.g., the drop version and the non-drop version). Content may be encoded using a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.). For example, client device 206a might receive fragments encoded at a bitrate of 3,200 kbps, and client device 206b might receive fragments encoded at a bitrate of 2,400 kbps. And depending on their network conditions might both begin to receive fragments at a bitrate of 3,200 kbps. After an encoding process, encoded fragments are stored in memory such as a local buffer for delivery to CDN 214 or to client devices 206a-e.

Manifest generation logic 210 can control the manner in which secondary fragments are included among primary fragments for manifest identifiers and manifest data. For example, secondary fragments can be included in pre-roll (before primary media content begins playback), mid-roll (during playback of primary media content), and post-roll locations (after primary media content completes playback). In some implementations, manifest data generation logic 210 uses predetermined cue points and durations associated with the primary content to insert secondary content fragments. In one example, a developer manually configures a manifest data template with predetermined cue points where advertisement fragments are to be inserted.

Manifest data generation logic 210 can use server-side fragment insertion techniques on a variety of types of manifest data, which depend on the type of adaptive bitrate streaming protocol used by the client device. Examples of adaptive bitrate streaming protocols include Microsoft Smooth Streaming, Dynamic Adaptive Streaming over HTTP (DASH), HTTP dynamic streaming, HTTP live streaming (HLS), etc. To illustrate, a smart TV with a media player using the DASH protocol will play back media content using manifest data that is particular to DASH, whereas another media player using the Smooth Streaming protocol will play back media content using manifest data particular to Smooth Streaming. In some implementations, manifests are generated using an Extensible Markup Language (XML) formatted document, but could also be provided any other markup language, for example, javascript object notation (JSON).

In addition to providing access to media content, server 203 may also include a variety of information related to the media content (e.g., various types of metadata and manifest data in data store 212 to which service 202 provides access). Alternatively, such information about the media content, as well as the media content itself may be provided and/or hosted by one or more separate platforms or databases, e.g., CDN 214. CDN 214 may help facilitate distribution of media content through a variety of software, hardware, and network components to client devices according to geographic proximity. It should be noted that while logic 210 and data store 212 are contemplated as integrated with server 203 of content service 202, implementations are also contemplated in which either or both operate remotely from the associated content service, and/or either or both are under the control of an independent entity. From these examples, those of skill in the art will understand the diversity of use cases to which the techniques described herein are applicable.

Client devices 206a-e can also include various types of logic, for instance, decoder logic for decoding the encoded media content received from edge server 204a and playback handling logic to request playback of portions of media content. In addition, client devices 206a-e includes various types of memory to store and/or cache decoded media, one or more processors, and other hardware components to request and decode the encoded media content provided by server 203. For example, the processors of client devices 206a-e execute stored instructions in memory to implement decoding and content retrieval techniques to acquire and play back content provided in accordance with the techniques disclosed herein. In addition, client devices 206a-e may communicate with server 203 through different types of network protocols such as a stateful connection, e.g., a physical socket connection between server and client, or using a stateless connection, for instance, using the Hypertext Transfer Protocol (HTTP).

It should be noted that, despite references to particular computing paradigms and software tools herein, the computer program product and the computer program instructions on which various implementations disclosed herein are based may correspond to any of a wide variety of programming languages, software tools, and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

A specific implementation will now be described with reference to FIG. 1, the computing environment of FIG. 2, and the flow diagram of FIG. 3. A client device (e.g., client device 104 of FIG. 1) sends a request for media content that is received by a media server such as media server 102 of FIG. 1 (302). A request for playback can be sent after a user selects an episode of Divorce through their smart TV, triggering the request for playback. In some implementations, the request of block 302 is received by an edge server of a CDN, which determines whether a cached copy of the manifest data exists locally before routing a request to a manifest service that may be controlled by a different service provider (e.g., content service 202 of FIG. 2).

A media server such as media server 102 of FIG. 1 begins the process of generating manifest data using server-side fragment insertion techniques by identifying an initial portion of primary media content (304). The initial portion of primary media content can refer to any length and/or segment of media content (a few seconds, minutes, etc.) before advertisement content is to be included. For example, media server 102 identifies the first 16 seconds of Divorce at origin server 106a.

Next, primary content fragments for the portion of primary media content are identified (306). For example, media server 102 identifies and selects Divorce fragments 108. In contrast to the secondary content fragments discussed below, media server 102 selects from among primary content fragments that have only one version for the video and audio fragments at each of the different available bit rates (e.g., the non-drop version). Manifest data and/or manifest identifiers can be generated dynamically based on a combination of primary content manifest data and secondary content manifest data (or source manifest data). For example, media server 102 identifies primary content manifest data for Divorce. The primary content manifest data might be, for example, a standard VOD manifest without secondary content inserted. In some implementations, a media server uses a dynamic manifest template that includes a predetermined order for where primary content fragments and secondary content fragments are to be inserted. Using the example above, media server 102 identifies 8 fragments (representing the initial 16 seconds of Divorce) from the primary content manifest and includes the references in the dynamic manifest.

Primary content fragments can be encoded using a substantially similar encoding profile as the secondary content fragments, allowing for a similar visual and audio experience during playback of both types of fragments. In particular, the encoding profile can use the same audio codec, audio channels, audio sample rate, video codec, some or all the bitrates of the feature fragments, frame rate, video bit depth, color space, display aspect ratio, etc. By encoding both types of fragments using substantially similar encoding profiles, transition between primary content and secondary content can appear like a seamless transition for the user. One difference (discussed in more detail below) between the encoding profiles is that the secondary content fragments include two versions of the secondary content audio fragments at each bit rate.

Media server 102 of FIG. 1 identifies an initial portion of secondary media content (308). The portion of secondary content can refer to a single fragment, all the secondary content fragments for a particular advertisement, or all the secondary content fragments for all of the advertisements to be associated with the manifest data. For example, media server 102 identifies 6 seconds of an advertisement for Game of Thrones, which might be located at a different origin server than the primary media content, for instance, origin server 106b. In some implementations, origin servers are controlled by different providers. For example, the primary content might be handled by an origin server controlled by content service 202 of FIG. 2 while an advertisement exchange server controls the secondary media content. The advertisement server provides advertisement content from an advertiser that successfully bids for the advertisement slot. The advertisement content might be personally tailored to the viewing habits of a user of client device 104 of FIG. 1 (e.g., a user watching Divorce might tend to interested in Game of Thrones).

Media server 102 determines a duration based on the portion of secondary media content identified in block 308 (310). The duration is used in conjunction with block 312 (discussed below) to determine which version of the audio fragment should be used. In some implementations, video fragments are pre-configured to be encoded at two second intervals, and as such, a media server would only need to determine a duration for the audio fragments, which have variable lengths depending on the audio sampling pattern used (discussed further below). For example, if 3 audio fragments have a duration of 6.015 seconds, duration determination logic could be configured to infer that the 6.015 duration for the audio fragments corresponds to a 6 second duration for the video fragments. In other implementations, a media server identifies durations for both video and audio fragments. For example, 6 seconds for the video fragments and 6.015 seconds for the audio fragments if only non-drop audio fragments were used.

Audio fragments may follow a variety of audio sampling patterns. The type of audio pattern may depend on the choice of audio codec. Examples of audio codecs include mp4a.40.5 AACHE, mp4a.40.29 AACHEv2, mp4a.40.2 AACLC, ec3, etc. Examples of sample rates include 24 kHz, 48 kHz, 96 kHz, etc. Depending on the codec used, an audio pattern may complete the pattern in a single fragment or the pattern may extend across multiple fragments. For example, using the ec-3 codec with a sample rate of 48 kHz an audio pattern is completed after two fragments. In another example, using the mp4a.40.2 AACLC codec with a sample rate of 48 kHz an audio pattern is completed after four fragments. In one more example, using the mp4a.40.5 AACHE codec with a sample rate of 24 kHz an audio pattern is completed after eight fragments.

In some implementations, a media server tracks a duration for secondary content audio fragments across periods of advertisement content. For example, an initial portion of secondary content fragments includes 6.015 seconds of audio fragments. When the media server repeats the determination of the duration of the next portion of secondary media content, it uses the 6.015 seconds as the starting time to be incremented based on the new duration determination.

For example, if the next portion of secondary media content also includes 6.015 seconds of audio fragments, then the total duration would be 12.03. Alternatively, a total duration might also include durations of the primary audio content fragments. For example, there might be six seconds of primary content audio fragments in between the first group of secondary content audio fragments and the second group of secondary content audio fragments for a total duration of 18.03 at the end of the second group of secondary content audio fragments.

In some implementations, the actual duration of the primary content audio fragments is not used as part of the duration determination. The reason being that just like secondary content audio fragments, primary content audio fragments use audio sampling techniques that do not always align exactly with fixed two-second intervals. However, this does not create an issue with synchronization between audio and video because if the last primary content audio fragment delivered before an advertisement begins and the sampling pattern for the primary content audio fragment had not completed, the first primary audio content fragment delivered at the end of the advertisement will pick up the sampling pattern where the previous primary content audio fragment left off and complete the sampling pattern. As such, the duration used for the primary content audio fragments can be based on the actual duration of the primary content video fragments (e.g., 2 seconds multiplied by 3 fragments is 6 seconds).

Returning to FIG. 3, media server 102 determines whether the duration determined in block 310 exceeds a threshold (312). A threshold can be any numerical value and typically represents an amount of delay beyond which a user might begin to perceive the lack of synchronization between audio and video during playback. In some cases, the threshold is 12.5 milliseconds, but the threshold might be any other amount of time that results in a perceived lack of synchronization between audio and video or lip sync error. For example, a threshold may be set anywhere between 5-45 milliseconds. In some implementations, there is an upper threshold and a lower threshold. In some cases, the upper and lower threshold values may be the same distance from exact alignment, for instance, 22 milliseconds for the upper threshold and −22 milliseconds for the lower threshold. In other cases, the upper and lower threshold values may be different because a user typically does not notice lack of synchronization as easily when the video is ahead of the audio. Examples include 15 milliseconds for an upper threshold and −45 milliseconds for a lower threshold and 45 milliseconds for an upper threshold and −125 milliseconds for a lower threshold.

As used herein, the term "exceed" can refer to a measurement where a value is substantially equal to (e.g., ±1-2 milliseconds), or above for an upper threshold, or below for a lower threshold another value representing the threshold. Alternatively, the term "exceed" can refer to a measurement where the absolute value of a duration is substantially equal to (e.g., ±1-2 milliseconds) an absolute value of a threshold or the absolute value of the duration exceeds the absolute value of the threshold. If a duration does not exceed a threshold, then a media server will select non-drop versions for each secondary content audio fragment in a period of secondary content. If the duration exceeds the threshold, then a media server will select non-drop versions for each secondary content audio fragment except the last fragment, for which the media server selects the drop version. When selecting secondary content audio fragments after the determination of block 310, by selecting a drop version of one of the secondary content audio fragments, the delay between the audio and video is reduced to a value below the threshold.

Figure 3:
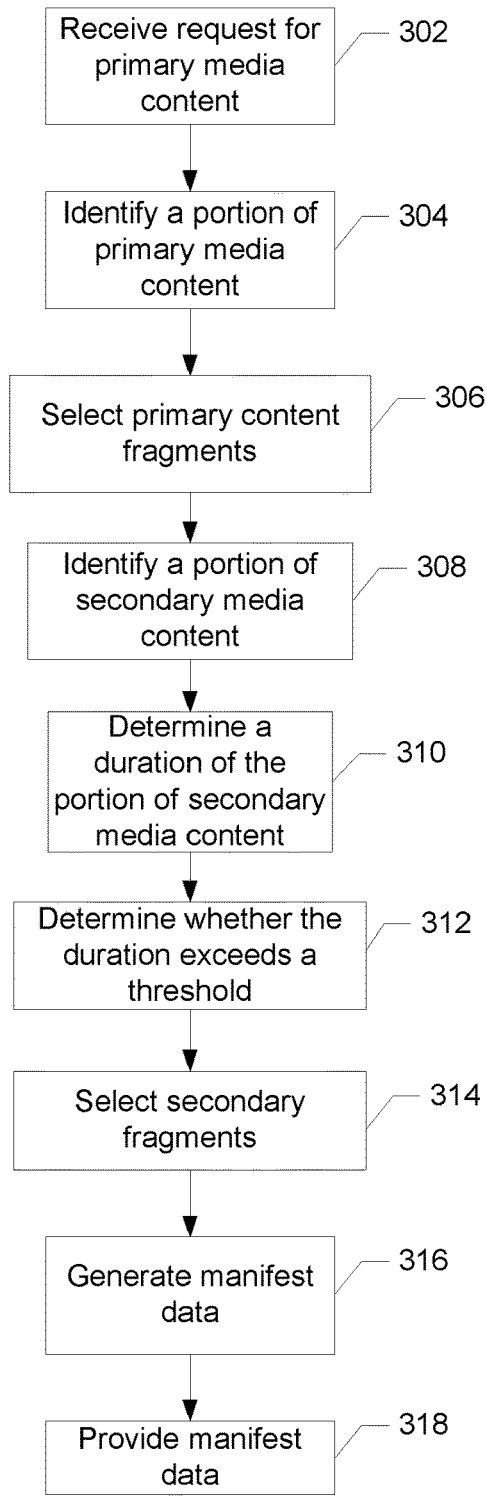
FIG. 3 is a flowchart illustrating operation of a particular implementation.

In FIG. 3, depending on the determination of block 312, media server 102 selects secondary content fragments (314). The selection process of block 314 includes selecting between different versions of the secondary content fragments. A non-drop version of an audio content fragment will increase the delay between the audio and video, and a drop version of the audio content fragment will reduce the delay between the audio and video. The number of frames in a fragment and the length of each frame can be determined using the duration of an audio fragment, the number of audio samples per frame, and the sample rate. For example, the equation is $$\frac{\text{Duration of an auido fragment}}{\frac{\text{Audio samples per frame}}{\text{Sample rate}}} = \text{Number of frames per fragment}$$

To illustrate using the mp4a.40.2 AACLC codec (e.g. 2.0053 seconds for non-drop fragments) with a sample rate of 48 kHz and 1024 samples per frame the equation is $$\frac{2.0053 \text{ seconds}}{\frac{1024 \text{ samples per frame}}{48 \text{ kHz}}} = 94 \text{ frames.}$$

If one frame is removed as part of creating a dropped version of an audio content fragment, then the dropped version of the audio content has 93 frames resulting in $$\frac{1024 \text{ samples per frame}}{48 \text{ kHz}} \times 93 = 1.984 \text{ seconds.}$$

In a simplified example, before interrupting the primary content with an advertisement, the total delay before beginning the advertisement is 10 milliseconds. The duration of the non-drop version of the secondary content audio fragments is 10.01, and as such, media server 102 will select a drop version for the last secondary content audio fragment because if the media server selected only non-drop audio fragments, there would be 20 milliseconds of delay between the audio and video. By selecting a drop version for the last audio content fragment (with one frame of 10 milliseconds removed), the total delay at the end of the advertisement is approximately 0.

As mentioned above, secondary content fragments can be encoded using a substantially similar encoding profile as the primary content fragments. While media server 102 uses a standard VOD manifest for selecting the primary content fragments, media server 102 can select secondary fragments according to different types of manifest data. In some implementations, secondary manifest data is similar to a standard VOD manifest except that it includes a drop version and a non-drop version of each fragment. For example, there would be one secondary content manifest for the Game of Thrones advertisement. In another example, the secondary content manifest includes references for Game of Thrones and every other advertisement that might be inserted using server-side fragment insertion techniques. In another implementation, secondary content manifests are created for each audio sampling pattern. The number of secondary content manifests for one advertisement can be large, e.g., using the equation of $2^{x\ distinct\ audio\ patterns}$xy unique advertisements=total number of secondary content manifests. Using the audio patterns mentioned above and assuming that there are 70 different advertisements, the number of secondary content manifests is 23*70, or 560 secondary content manifests.

In some implementations, the blocks 304-314 iterate as necessary until all of the primary and secondary fragments have been selected. Next, manifest data is generated based on the fragments selected (316). In some implementations, the manifest data is an encoded URL that includes a secondary content identifier, a start time of the secondary content fragments, a length of the secondary content fragments, and an indication of an audio version for each advertisement to be included with playback of the primary content. An example of a URL with one advertisement is "example.cdn.net/GOT.ism/AdStart(12 seconds)/AdLength (10 seconds)/AdID(moviepreview1)AudioVersion(nondrop)." In another example, a URL with two advertisements is "example.cdn.net/GOT.ism/AdStart(12 seconds)/AdLength(10 seconds)/AdID(moviepreview1)AudioVersion (nondrop)/AdStart(40 seconds)/AdLength(10 seconds)/AdID(moviepreview2)AudioVersion(drop)." After a client device requests playback using the encoded URL, manifest data is generated based on the encoded URL. For example, the secondary content information from the URL can be used to insert references to the secondary content fragments between portions of primary content fragments when the manifest data is generated. Using the URL example with two advertisements, the sequence of fragments in the manifest data starts with references to 6 primary content fragments, followed by 5 secondary content fragments (with non-drop version audio fragments), returns to 8 primary content fragments, and finishes with 5 secondary content fragments (with drop version audio fragments). Alternatively, the manifest data can be generated based on the secondary content fragments without using the encoded URL. For example, inserting references directly into manifest data based on secondary content manifests implemented as described further above where a secondary content manifest is created for each audio sampling pattern and each advertisement. A simplified example of manifest data is shown in FIG. 4. As shown in FIG. 4 manifest data 402 includes references to audio fragments at a variety of bitrates (e.g., 128 kbps, 64 kbps, and 32 kbps). Manifest data 402 also includes references to audio fragments associated with primary content (e.g., fragments A, B, C, and D) and references to audio fragments associated with secondary content (e.g., fragments X, Y, and Z). Each fragment includes an index or time range (e.g., Time range=0 minutes 0 seconds to 0 minutes 5 seconds) and a location of the fragment (e.g., Location=\Media\Movies\A093b2b_1.isma). It should be noted that in manifest data 402 fragments X, Y, and Z include additional information about the version of the audio fragment. For example, the references for fragment X and Y indicate that upon their request, a client device will receive a non-drop version of the secondary content audio fragment. However, the reference to fragment Z indicates that upon request, a client device will receive a drop version of the secondary content audio fragment. In some implementations, this information is encoded in an identifier included in a fragment request to an edge server of a CDN. The manner in which an audio version is represented may vary, for instance, as a bit encoded using a predefined binary protocol, the value returned after the threshold determination, or a relative value based on the durations of the preceding secondary content fragments, etc. Other information included as part of a request includes a protocol specification, an edge server location, a quality level, a media content type, an index of the fragment, and a length of the fragment, etc.

Returning to FIG. 3, the manifest data is provided to the client device of block 302 (318). The client device then requests manifest data using the manifest identifier or fragments using the manifest data. In order to determine whether a fragment request is for a primary content fragment or a secondary content fragment, an edge server uses the additional data added to a URL included in the fragment request (e.g., a location identifier, the start time, a fragment identifier, etc.). In addition, if the request is for a secondary content fragment, the edge server further determines which version of the secondary content audio fragment should be provided. This determination can be based on a bit included in the fragment identifier that indicates whether the request is for a non-drop version of drop version of the secondary content audio fragment.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more processors and memory configured to:
    identify a first portion of primary media content;
    select a first set of primary media fragments associated with the first portion of the primary media content;
    identify a first portion of advertisement media content, the advertisement media content having first version audio fragments and second version audio fragments associated therewith, the second version audio fragments corresponding to the first version audio fragments and including fewer frames of audio content than the corresponding first version audio fragments;
    determine a first duration based on the first portion of the advertisement media content, the first duration representing a potential delay between audio and video during playback;
    determine that the first duration is below a threshold, the threshold representing a value at which lack of synchronization between audio and video is perceivable by a user;
    select a first set of advertisement media fragments associated with the first portion of the advertisement media content, the first set of advertisement media fragments including the first version audio fragments;
    identify a second portion of the primary media content;
    select a second set of primary media fragments associated with the second portion of the primary media content;

identify a second portion of the advertisement media content;
identify a second duration based on the first portion of the advertisement media content and the second portion of the advertisement media content;
determine that the second duration exceeds the threshold;
select a second set of advertisement media fragments associated with second portion of the advertisement media content, the second set of advertisement media fragments including the first version audio fragments and at least one of the second version audio fragments; and
generate a manifest uniform resource locator including a first index associated with the first set of advertisement media fragments and a second index associated with the second set of advertisement media fragments.

2. The system of claim 1, wherein the threshold represents a synchronization difference in a range between 10 milliseconds and 130 milliseconds.

3. The system of claim 1, wherein the second version audio fragments include one less frame of audio content than the first version audio fragments.

4. The system of claim 1, wherein the first set of advertisement media fragments are selected using advertisement content manifest data, the advertisement content manifest data including references to the first version audio fragments and the second version audio fragments.

5. A system, comprising one or more processors and memory configured to:
identify a portion of first media content;
select first media fragments associated with the portion of the first media content;
identify a portion of second media content, the second media content having first version audio fragments and second version audio fragments associated therewith, the second version audio fragments corresponding to the first version audio fragments and including fewer media frames than the first version audio fragments;
determine a duration based on the portion of the second media content, the duration representing a potential delay between audio and video during playback;
determine that the duration exceeds a threshold;
select second media fragments associated with the portion of the second media content, the second media fragments including a plurality of the first version audio fragments and at least one of the second version audio fragments; and
generate client manifest data, the client manifest data including references to the first media fragments and an index associated with the second media fragments.

6. The system of claim 5, wherein the client manifest data is a manifest identifier, and wherein the index associated with the second media fragments includes at least one of: a secondary content identifier, a start time of the second media fragments, a length of the second media fragments, or an indication of an audio version.

7. The system of claim 5, wherein the one or more processors and memory are further configured to generate the manifest data by:
identifying an additional portion of the first media content;
selecting additional first media fragments associated with the additional portion of the first media content;
identifying an additional portion of the second media content;
determining an additional duration based on the portion of the second media content and the additional portion of the second media content;
determining that the additional duration does not exceed the threshold;
selecting additional second media fragments associated with the additional portion of the second media content, the second media fragments including only the first version audio fragments; and
wherein the client manifest data further includes an additional index associated with the additional second media fragments.

8. The system of claim 7, wherein the one or more processors and memory are configured to select the second media fragments based on first source manifest data associated with the portion of second media content, and the additional second media fragments are selected using second source manifest data associated with the additional portion of the second media content, the first source manifest data being distinct from the second source manifest data.

9. The system of claim 5, wherein the one or more processors and memory are configured to select the second media fragments based on source manifest data associated with the second media content, the source manifest data including references to both the first version audio fragments and the second version audio fragments.

10. The system of claim 5, wherein the threshold represents a synchronization difference in a range between 10 milliseconds and 130 milliseconds.

11. The system of claim 5, wherein the threshold is an upper threshold or a lower threshold.

12. The system of claim 5, wherein the one or more processors and memory are configured to identify the portion of the second media content by also identifying one or more additional portions of the second media content to be included in the client manifest data prior to identifying the portion of the second media content.

13. A method, comprising:
identifying a portion of first media content;
selecting first media fragments associated with the portion of the first media content;
identifying a portion of second media content, the second media content having first version audio fragments and second version audio fragments associated therewith, the second version audio fragments corresponding to the first version audio fragments and including fewer media frames than the first version audio fragments;
determining a duration based on the portion of the second media content, the duration representing a potential delay between audio and video during playback;
determining that the duration exceeds a threshold;
selecting second media fragments associated with the portion of the second media content, the second media fragments including a plurality of the first version audio fragments and at least one of the second version audio fragments; and
generating client manifest data, the client manifest data including references to the first media fragments and an index associated with the second media fragments.

14. The method of claim 13, wherein the client manifest data is a manifest identifier, and wherein the index associated with the second media fragments includes at least one of: a secondary content identifier, a start time of the second media fragments, a length of the second media fragments, or an indication of an audio version.

15. The method of claim 13, wherein generating the manifest data includes:

identifying an additional portion of the first media content;

selecting additional first media fragments associated with the additional portion of the first media content;

identifying an additional portion of the second media content;

determining an additional duration based on the portion of the second media content and the additional portion of the second media content;

determining that the additional duration does not exceed the threshold;

selecting additional second media fragments associated with the additional portion of the second media content, the second media fragments including only the first version audio fragments; and wherein the client manifest data further includes an additional index associated with the additional second media fragments.

16. The method of claim 15, wherein selecting the second media fragments is based on first source manifest data associated with the portion of second media content, and the additional second media fragments are selected using second source manifest data associated with the additional portion of the second media content, the first source manifest data being distinct from the second source manifest data.

17. The method of claim 13, wherein selecting the second media fragments is based on source manifest data associated with the second media content, the source manifest data including references to both the first version audio fragments and the second version audio fragments.

18. The method of claim 13, wherein the threshold represents a synchronization difference in a range between 10 milliseconds and 130 milliseconds.

19. The method of claim 13, wherein the threshold is an upper threshold or a lower threshold.

20. The method of claim 13, wherein identifying the portion of the second media content includes identifying one or more additional portions of the second media content to be included in the client manifest data prior to identifying the portion of the second media content.

* * * * *